Patented July 9, 1935

2,007,315

UNITED STATES PATENT OFFICE 2,007,315

PROCESS OF MAKING FORMED GYPSUM PRODUCTS

George M. Turner, Claremont, Calif., assignor of one-half to C. R. Birdsey, Pasadena, Calif.

No Drawing. Application June 16, 1933, Serial No. 676,217

7 Claims. (Cl. 106—34)

This invention relates to molded, cast or otherwise formed gypsum products and to a process of making the same. It may also be said that this invention relates to a process and to a product in which gypsum is used and in which the critical temperature of dissociation of hydrated calcium sulfate may be raised and controlled.

By the term "gypsum products" as used herein, reference will be made generically to those products which result from the setting of plastic masses or mixtures containing the calcined powdered gypsum and water ($CaSO_4.2H_2O$) with or without other substances, such as retarders, hardening or accelerating agents, fiber, fillers, etc. Calcined gypsum is often termed "plaster of Paris" ($2CaSO_4.H_2O$) and when the calcination is carried out at higher temperatures and treated with a catalyst, the product is termed "Keene's cement". In the setting of gypsum products, the hemihydrate presumably dissolves to form a supersaturated solution from which the dihydrate crystallizes into crystal form. The strength of the formed gypsum product is due to the formation of the crystalline structure of the set calcium sulfate.

The present invention particularly relates to two phases of the art and use of set, formed gypsum products.

(a) The first phase is that of manufacture when a plastic mass is made by mixing water, calcined gypsum and often other ingredients, allowing the plastic mass to set in a form or mold, then drying out the excess moisture, the material then being in shippable form and its strength dependent upon the gypsum remaining in crystallized form.

(b) The second phase is that of use of the product after installation. Gypsum products such as block, tile and gypsum wallboards, are light and insulative. At the present time, however, their use is limited to those places where the temperature does not exceed 110° F. to 115° F., for at temperatures above these values the water of crystallization dissociates rapidly from the crystallized particle, destroying the crystal and the resultant strength of the product.

It has been discovered that formed gypsum products may be caused to withstand higher heats during drying and also after drying without material loss in strength and without marked dissociation of the hydrated crystal forms. In other words, it has been discovered that the critical dissociation temperature (normally about 105° F.) at which the set products slowly begin to lose their water of dissociation and to lose structural strength, can be modified considerably. This novel result is attained by the use of certain chemicals, notably sugars, in the mix from which the gypsum products are formed.

It is an object of this invention, therefore, to disclose and provide a method of forming gypsum products which are capable of withstanding time and temperature conditions which would normally cause dissociation and loss in strength.

Another object is to disclose a relatively heat-resistant gypsum product, capable of successfully resisting higher temperatures than the same material would resist if not so treated.

These and other objects, uses, advantages and adaptations of this invention, as well as the preferred mode of operation, will become apparent to those skilled in the art from the following detailed description of the invention.

Formed gypsum products, such as partition tile, roof tile, plaster boards, etc., containing hydrated and crystallized calcium sulfate, must be dried before being shipped or used. During the drying operation, the highest temperatures possible are employed as the greatest economy and the largest capacity from a given drying unit are obtained when the higher heats are employed. Both plant capacities and plant economies have been limited up to the present time because of the tendency of higher temperatures to destroy the crystalline structure of the formed gypsum bodies by dissociation. As stated before, the dissociation of the hydrated calcium sulfate not only drives off the water of crystallization, but causes the bodies to lose strength due to the changes in the form and strength of the individual crystals.

It has been discovered and conclusively proven that certain amounts of chemicals, notably sugar, when mixed with a mass of calcined gypsum and water, will raise its critical temperature of dissociation. Chemicals which have been found capable of raising the critical dissociation temperature are those which are water soluble, have a crystalline structure similar to set plaster of Paris (such as the monosymmetric form) and which have a dissociation temperature above 105° F. Among the substances which have been proven as influencing the dissociation temperature of set plaster of Paris, in accordance with this invention, are the sugars as a group (including sucrose, dextrose, levulose, etc. in their various commercial forms), dextrin, alkaline sulfates, alkaline oxalates, and certain salts of the heavy metals such as manganese sulfate and chloride.

Some of these substances are more efficient than others. The most effective agent tested is corn sugar or dextrose, although cane sugar or beet sugar (sucrose) is nearly as effective. Molasses is another form of sugar which has been successfully used. The various chemicals and substances may be used either singly or in combination. For example, potassium sulfate alone or a blend of potassium sulfate and corn sugar, make effective agents for the purposes of this invention.

For example, when no sugar is used in the mixture of gysum and water (it being understood that other materials may or may not be present), the dissociation temperature begins at about 105° F. When 1% of sugar by weight is added to such mixture, the dissociation point of the said body is raised to about 140° F.; 2% of sugar raises it to about 160° F. and 3% of sugar to about 175° F. It has been found that beneficial results may be obtained with quantities of sugar as low as 0.5% and that as much as 3% can be used without producing any detrimental effect, such as injurious efflorescence or decrease in strength.

In accordance with this invention, therefore, a mixture containing calcined gypsum, water and the desired amount of sugar, is made up and gypsum bodies are formed therefrom by casting, molding, etc. Such formed bodies are permitted to set and are then dried in any suitable type of apparatus. The temperature and time conditions used during this drying operation may be such as to substantially dry and set bodies without appreciable dissociation and loss of water of crystallization, even though the temperature and time conditions are such as would cause the dissociation of normal gypsum products, to which sugar had not been added.

It is to be understood that in the normal drying operations, temperatures in excess of 105° F. are employed and this is possible because of the humidity, time, temperature, air current velocities and other factors which so balance as to dry the set gypsum bodies without causing injurious dissociation. An ordinary formed gypsum body can be subjected to a temperature as high as 210° F. without dissociation provided the time interval is short enough. A protracted exposure to a temperature of only 110° F. however, will eventually cause dissociation of the body.

The gypsum bodies of this invention, containing preferably from 0.5% to 3% of sugar, may be exposed to materially higher temperatures for the same length of time than normal gypsum bodies are subjected to. Those skilled in the art will therefore appreciate that a much larger quantity of formed gypsum bodies may be dried in a given unit provided the bodies are made in accordance with this invention, because higher temperatures may be employed during drying without dissociation of the crystallized articles and without the concomitant loss in strength which would normally be observed.

Furthermore, it is to be noted that the present invention not only gives rise to advantages obtainable during the manufacture of formed gypsum products, but also gives rise to products which have a wider field of application. Normal gypsum products of the nature described, when satisfactorily made and dried, are now limited in their use to those installations and places where the temperatures are not much in excess of 110° F. or 115° F., because at these temperatures the normal gypsum products will dissociate and become soft and useless in measurable and useful time intervals. In other words, the useful life of a gypsum product becomes uneconomically short when the normal gypsum product is used at a temperature above say 110° F. There are a great many places, however, such as boiler rooms, drying rooms, roofs in hot climates, etc., where temperatures much in excess of 110° F. or 115° F. are prevalent. This large field is closed to normal gypsum products and the user is compelled to use more expensive and less efficient material that will stand such increased temperatures for a prolonged period of time. The product of this invention, however, containing sugar in the quantities stated hereinbefore, is capable of being used under conditions where temperatures as high as 140° F. to 150° F. are encountered for prolonged periods of time without the disintegrating effect produced by dissociation of the product.

Although particular advantages and adaptations of this invention have been pointed out hereinabove, further advantages, uses and adaptations of the invention will become apparent to those skilled in the art. All such changes and modifications as come within the scope of the appended claims are embraced thereby.

I claim:

1. A process of making formed gypsum bodies, which comprises forming a mixture containing calcined gypsum as a major ingredient, water and sugar, permitting the mixture to set into a formed body, and then subjecting the set formed body to a temperature and for a time sufficient to substantially dry the set body without appreciable dissociation and loss of water of crystallization, said temperature and time being such as would cause dissociation of the same gypsum products made without the sugar content.

2. A process of making formed gypsum bodies, which comprises forming a mixture containing calcined gypsum as a major ingredient, water and 0.5% to 3% of sugar by weight, permitting the mixture to set into a formed body, and then subjecting the set formed body to a temperature and for a time sufficient to substantially dry the set body without appreciable dissociation and loss of water of crystallization, said temperature and time being such as would cause dissociation of the same gypsum products made without the addition of sugar in amounts of from 0.5% to 3% by weight.

3. A process of making formed gypsum bodies, which comprises forming a mixture containing calcined gypsum as a major ingredient, water and dextrose, permitting the mixture to set into a formed body, and then subjecting the set formed body to a temperature and for a time sufficient to substantially dry the set body without appreciable dissociation and loss of water of crystallization, said temperature and time being such as would cause dissociation of the same gypsum products made without the addition of dextrose.

4. A process of making formed gypsum bodies, which comprises forming a mixture containing calcined gypsum as a major ingredient, water and a water soluble substance having a crystalline structure similar to set plaster of Paris and a dissociation temperature above 105° F., permitting the mixture to set into a formed body, and then subjecting the said formed body to a temperature and for a time sufficient to substantially dry the set body without appreciable dissociation and loss of water of crystallization, said temperature and time being such as would cause dissociation of the same gypsum products made without the addition of a water soluble substance having a crystalline structure similar to set plaster of Paris and a dissociation temperature above 105° F.

5. A process of making formed gypsum bodies, which comprises forming a mixture containing calcined gypsum as a major ingredient, water and 0.5% to 4% of a water soluble substance having a crystalline structure similar to set plaster of Paris and a dissociation temperature above 105° F., permitting the mixture to set into a formed body, and then subjecting the said formed body to a temperature and for a time sufficient to substantially dry the said body without appreciable dissociation and loss of water of crystallization, said temperature and time being such as would cause dissociation of the same gypsum products made without the addition of from 0.5% to 4% of a water soluble substance having a crystalline structure similar to set plaster of Paris and a dissociation temperature above 105° F.

6. A process of making formed gypsum bodies, which comprises forming a mixture containing calcined gypsum as a major ingredient, water and about 0.5% to 4% by weight of water soluble substance having a monosymmetric crystalline form and a dissociation temperature above 105° F., permitting the mixture to set into a formed body, and then subjecting the said formed body to a temperature and for a time sufficient to substantially dry the said body without appreciable dissociation and loss of water of crystallization, said temperature and time being such as would cause dissociation of the same gypsum products made without the addition of about 0.5% to 4% by weight of water soluble substance having a monosymmetric crystalline form and a dissociation temperature above 105° F.

7. A process of making formed gypsum bodies, which comprises forming a mixture containing calcined gypsum as a major ingredient, water and a water soluble substance having a crystalline structure similar to set plaster of Paris and a dissociation temperature above 105° F. from the group consisting of sugars, dextrose, alkaline sulfates, alkaline oxalates and salts of the heavy metals, permitting the mixture to set into a formed body, and then subjecting the said formed body to a temperature and for a time sufficient to substantially dry the said body without appreciable dissociation and loss of water of crystallization, said temperature and time being such as would cause dissociation of the same gypsum products made without the addition of a water soluble substance having a crystalline structure similar to set plaster of Paris and a dissociation temperature above 105° F., from the group consisting of sugars, dextrose, alkaline sulfates, alkaline oxalates and salts of the heavy metals.

GEORGE M. TURNER.